No. 627,482.
T. A. COLEMAN.
CHAIN CONVEYER.
(Application filed Mar. 15, 1899.)
(No Model.)
Patented June 27, 1899.
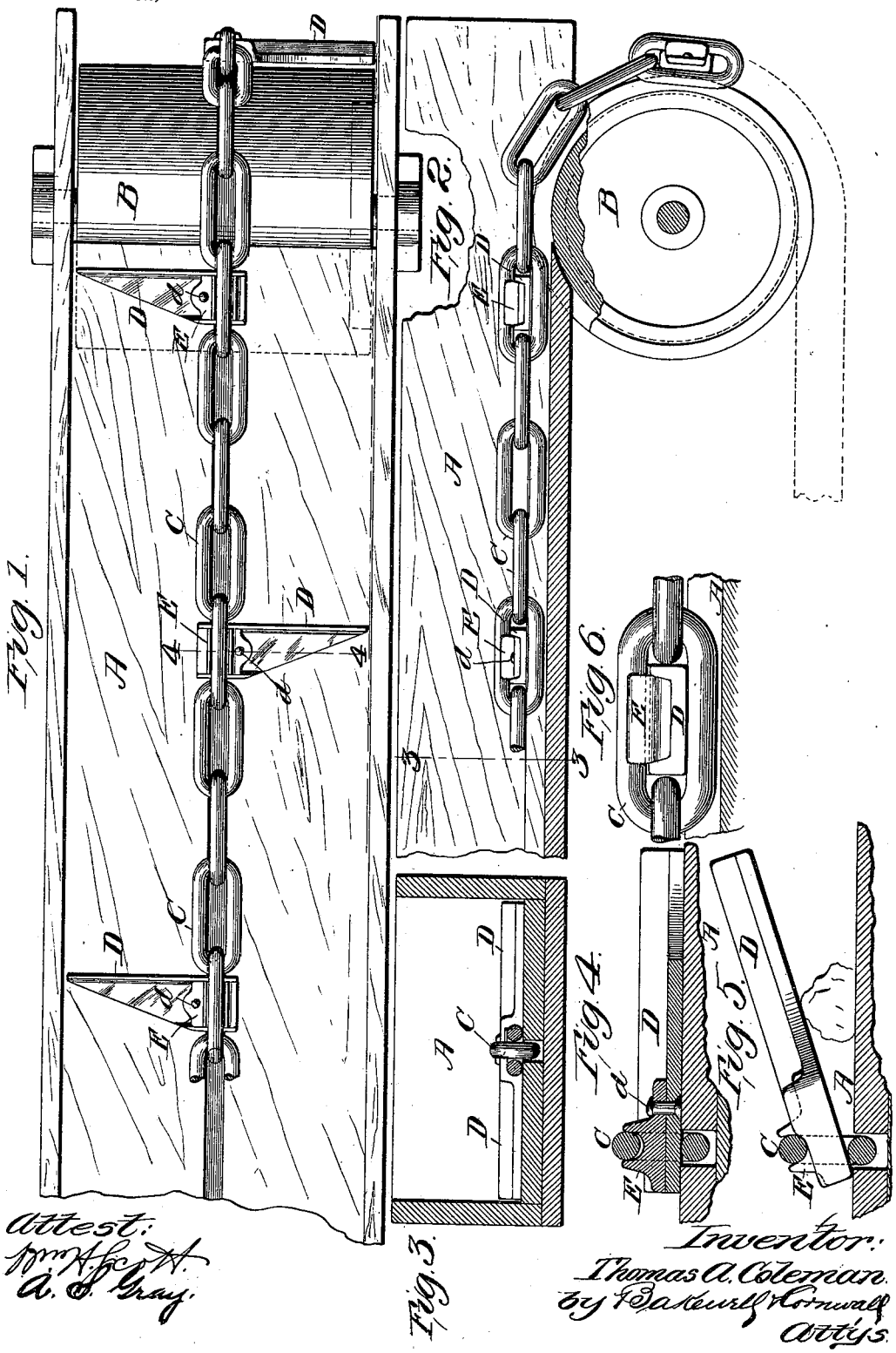

UNITED STATES PATENT OFFICE.

THOMAS A. COLEMAN, OF MILLVILLE, ARKANSAS.

CHAIN CONVEYER.

SPECIFICATION forming part of Letters Patent No. 627,482, dated June 27, 1899.

Application filed March 15, 1899. Serial No. 709,166. (No model.)

*To all whom it may concern:*

Be it known that I, THOMAS A. COLEMAN, a citizen of the United States, residing at Millville, Ouachita county, State of Arkansas, have invented a certain new and useful Improvement in Chain Conveyers, of which the following is a full, clear, and exact description, reference being had to the accompanying drawings, forming a part of this specification, in which—

Figure 1 is a top plan view of a trough in which is arranged the portion of a chain carrying my improved flights. Fig. 2 is a longitudinal sectional view of a trough, showing a piece of chain in position thereon. Fig. 3 is a cross-sectional view on line 3 3 of Fig. 2. Fig. 4 is an enlarged detail view in cross-section through one of the flights. Fig. 5 is a similar view showing the flight in elevation and raised to pass over an obstruction, and Fig. 6 illustrates the inner end of a flight in position on a link of a chain.

This invention relates to a new and useful improvement in chain conveyers especially adapted for use in carrying off refuse lumber from sawmills, &c.; but it is obvious that there are other uses to which my invention can be put without departing from the nature and principle of the same.

The essential features of this invention reside, first, in the novel construction of the flight proper; second, in the novel means employed for attaching said flight to a chain; third, in the novel manner in which I construct the sheave which the chain and flights pass over, and, finally, the invention consists in the novel construction, arrangement, and combination of the several parts, all as will hereinafter be fully described and afterward pointed out in the claims.

In the drawings I have illustrated a trough A, at one end of which is a sheave B, provided with a circumferential groove for the reception of the vertical links of the chain, the horizontal links resting on the periphery of the sheave.

C indicates an ordinary chain.

D indicates the flights of my improved conveyer-chain, which preferably consist of short sections of commercially-rolled iron or steel, whose cross-section is of the well-known channel-beam form. For the sake of lightening the flights I prefer to remove a portion of the metal at the rear edge of the flight, as shown in Fig. 1.

E indicates a bearing or key, which, as shown more clearly in Figs. 4 and 6, consists of a block fitting in the channel of the flight, said block being provided on its upper face with a grooved projection for receiving one side of a chain-link.

In attaching a flight to a link the block E is first placed in position and raised so as to seat one side of the link into its groove, and the flight is then slipped thereunder, one or more rivets or attaching devices $d$ being employed to secure the flight in position on the block. The flight is thus pivoted to the chain-link and may rest, as shown in Fig. 5, to escape an obstruction or release itself from the article or material being carried. It will be noted that the flight proper does not interfere with the flexibility of the chain, does not weaken the chain, and can be attached to any link of the chain, which renders it adjustable. It is easily applied, and when broken can be replaced at comparatively small expense in a short time, requiring no special tools for its application. Of course the flights where the chain passes over a sheave are arranged on links lying in the same plane and preferably project from both sides of the chain. Where the material is removed from the rear edge of the flights, they are made in rights and lefts, the blocks E being cast from a single pattern for all the flights.

I am aware that minor changes in the construction, arrangement, and combination of several parts of my device can be made and substituted for those herein shown and described without in the least departing from the nature and principle of my device.

Having thus described my invention, what I claim, and desire to secure by Letters Patent, is—

1. In combination with a chain, of laterally-disposed flights carried thereby, said flights being alternately branched from said chain, in that one flight starts from the chain and extends to the right, and the next flight starts from the chain and extends to the left, and means for permitting said flights to rock on said chain; substantially as described.

2. In combination with a chain, of a flight, one end of said flight being passed through the link of said chain, a securing-block interposed between said flight and one side of the link of said chain, said securing-block being provided with a concave seat for receiving one side of said link, and means for attaching said securing-block to said flight; substantially as described.

3. The combination with a flight, of channel-beam form, of a securing-block fitted in the channel thereof, a concave seat formed in the upper face of said securing-block, for engagement with a link of a chain, and means for attaching said securing-block to said link; substantially as described.

4. The combination with the link of a chain, of a flight of channel-beam form, of a securing-block fitted in the channel thereof, of a concave seat formed in the upper face of said securing-block for engagement with said link, and a rivet which passes through said flight and said securing-block for holding the same together; substantially as described.

5. The combination with a trough of a circumferentially-grooved sheave, a chain which passes over said sheave, one side of the links of said chain being received in the groove in said sheave, flights introduced into the links of said chain, which are received by the groove in said sheave, and bearing-blocks on said flights for engaging the side of the links opposite that side which is received by said groove; substantially as described.

In testimony whereof I hereunto affix my signature, in the presence of two witnesses, this 1st day of March, 1899.

THOMAS A. COLEMAN.

Witnesses:
J. A. FREEMAN,
F. J. HUGHES.